US011887556B2

(12) United States Patent
Zhou et al.

(10) Patent No.: US 11,887,556 B2
(45) Date of Patent: Jan. 30, 2024

(54) DATA DRIVING CIRCUIT, DISPLAY MODULE, AND DISPLAY DEVICE

(71) Applicant: HKC CORPORATION LIMITED, Shenzhen (CN)

(72) Inventors: Mancheng Zhou, Guangdong (CN); Shuang Wang, Guangdong (CN); Rongrong Li, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/083,335

(22) Filed: Dec. 16, 2022

(65) Prior Publication Data

US 2023/0377531 A1 Nov. 23, 2023

(30) Foreign Application Priority Data

May 20, 2022 (CN) ......................... 202210549012.4

(51) Int. Cl.
*G09G 3/36* (2006.01)
*G09G 3/20* (2006.01)

(52) U.S. Cl.
CPC ......... *G09G 3/3696* (2013.01); *G09G 3/2096* (2013.01); *G09G 3/3688* (2013.01); *G09G 2320/0626* (2013.01); *G09G 2320/0673* (2013.01)

(58) Field of Classification Search
CPC .......... G09G 3/36–3696; G09G 3/2092–2096; G09G 2320/0673
See application file for complete search history.

(56) References Cited

U.S. PATENT DOCUMENTS 6,160,534 A * 12/2000 Katakura ............. G09G 3/3648 345/98
6,674,420 B2 * 1/2004 Matsueda ............ G09G 3/3688 345/95
7,202,844 B2 * 4/2007 Nakamigawa ....... G09G 3/3611 345/89
(Continued)

FOREIGN PATENT DOCUMENTS

CN 1291762 A 4/2001
CN 102411891 A 4/2012
(Continued)

OTHER PUBLICATIONS

First Office Action issued in corresponding CN Application No. CN202210549012.4, dated Jun. 23, 2022, pp. 1-9, Beijing, China.

*Primary Examiner* — Patrick F Marinelli
(74) *Attorney, Agent, or Firm* — HAUPTMAN HAM, LLP

(57) ABSTRACT

A data driving circuit, a display module, and a display device are provided. The data driving circuit at least includes a selecting unit and a signal conversion unit. The selecting unit is configured to directly output an image signal received to the signal conversion unit, or invert the image signal and then transmit the image signal inverted to the signal conversion unit. The control signal represents a display mode of a pixel unit that receives the image signal and perform image display according to the image signal. The signal conversion unit is configured to convert the image signal into a grayscale voltage in an analog form. The grayscale voltage is transmitted to the pixel unit to perform image display.

16 Claims, 11 Drawing Sheets

(56) References Cited

U.S. PATENT DOCUMENTS

| | | | | |
|---|---|---|---|---|
| 7,683,870 | B2 * | 3/2010 | Kang | G09G 3/2011 345/98 |
| 8,730,227 | B2 * | 5/2014 | Lee | G09G 3/3696 345/212 |
| 9,423,637 | B2 * | 8/2016 | Saitoh | G09G 3/3688 |
| 2001/0002828 | A1 * | 6/2001 | Nakamigawa | G09G 3/3611 345/87 |
| 2002/0003521 | A1 * | 1/2002 | Matsueda | G09G 3/3688 345/89 |
| 2006/0290638 | A1 * | 12/2006 | Kang | G09G 3/3688 345/98 |
| 2009/0040244 | A1 * | 2/2009 | Lee | G09G 3/3696 345/89 |

FOREIGN PATENT DOCUMENTS

| | | | |
|---|---|---|---|
| CN | 102460553 | A | 5/2012 |
| CN | 107799089 | A | 3/2018 |
| CN | 110379383 | A | 10/2019 |
| CN | 114141211 | A | 3/2022 |
| JP | 2006350316 | A | 12/2006 |

* cited by examiner

DATA DRIVING CIRCUIT, DISPLAY MODULE, AND DISPLAY DEVICE

CROSS-REFERENCE TO RELATED APPLICATIONS

This application claims priority under 35 U.S.C. § 119(a) to Chinese Patent Application No. 202210549012.4, filed May 20, 2022, the entire disclosure of which is incorporated herein by reference.

TECHNICAL FIELD

This disclosure relates to the field of display technology, and in particular to a data driving circuit, a display module, and a display device.

BACKGROUND

At present, a Liquid-Crystal-Display (LCD) panels are mainstream display devices in the market. According to display modes of LCD panels, the LCD panels can be divided into a normally-white LCD panel and a normally-black LCD panel. When no voltage is applied to the normally-white LCD panel, a liquid crystal layer is transparent and displays a bright picture, while when no voltage is applied to the normally-black LCD panel, the liquid crystal layer is opaque and displays a dark picture. By research, since liquid crystal layers of the normally-white LCD panel and the normally-black LCD panel are designed differently, corresponding data driving circuits are designed differently, which cannot make a data driving circuit applicable to both the normally-white LCD panel and the normally-black LCD panel, resulting in poor compatibility of the data driving circuit.

SUMMARY

A data driving circuit is provided in implementations of the present disclosure. The data driving circuit at least includes a selecting unit and a signal conversion unit. The selecting unit is configured to receive an image signal in a digital form, and the selecting unit is configured to directly output the image signal received to the signal conversion unit according to a control signal, or invert the image signal and then transmit the image signal inverted to the signal conversion unit. The control signal represents a display mode of a pixel unit for image display. The signal conversion unit is configured to convert the image signal into a grayscale voltage in an analog form. The grayscale voltage is used to drive the pixel unit to perform image display.

A display module is further provided in implementations of the present disclosure. The display module includes a data driving circuit, a scan driving circuit, a Liquid-Crystal-Display (LCD) panel, and a display control circuit. The data driving circuit at least includes a selecting unit and a signal conversion unit. The selecting unit is configured to receive an image signal in a digital form, and the selecting unit is configured to directly output the image signal received to the signal conversion unit according to a control signal, or invert the image signal and then transmit the image signal inverted to the signal conversion unit. The control signal represents a display mode of a pixel unit for image display. The signal conversion unit is configured to convert the image signal into a grayscale voltage in an analog form. The grayscale voltage is used to drive the pixel unit to perform image display. The display control circuit is configured to receive an original data signal from an external signal source, and output a source output control signal and a gate output control signal individually. The LCD panel is controlled to perform image display by the data driving circuit according to the source output control signal and the scan driving circuit according to the gate output control signal.

A display device is further provided in implementations of the present disclosure. The display device includes a display module, a supporting frame, and a power supply module. The display module includes a data driving circuit, a scan driving circuit, a LCD panel, and a display control circuit. The data driving circuit at least includes a selecting unit and a signal conversion unit. The selecting unit is configured to receive an image signal in a digital form, and the selecting unit is configured to directly output the image signal received to the signal conversion unit according to a control signal, or invert the image signal and then transmit the image signal inverted to the signal conversion unit. The control signal represents a display mode of a pixel unit for image display. The signal conversion unit is configured to convert the image signal into a grayscale voltage in an analog form. The grayscale voltage is used to drive the pixel unit to perform image display. The display control circuit is configured to receive an original data signal from an external signal source, and output a source output control signal and a gate output control signal individually. The LCD panel is controlled to perform image display by the data driving circuit according to the source output control signal and the scan driving circuit according to the gate output control signal. The power supply module is configured to provide a power supply voltage for the display module for image display, and the display module and the power supply module are fixed to the supporting frame.

BRIEF DESCRIPTION OF THE DRAWINGS

In order to explain technical solutions in implementations of the present disclosure more clearly, the following will give a brief introduction to accompanying drawings which are needed to be used in description of implementations or the related art. Apparently, the accompanying drawings in the following description are some implementations of the present disclosure. For those skilled in the art, other accompanying drawings can be obtained according to these accompanying drawings without creative efforts.

Figure 1:
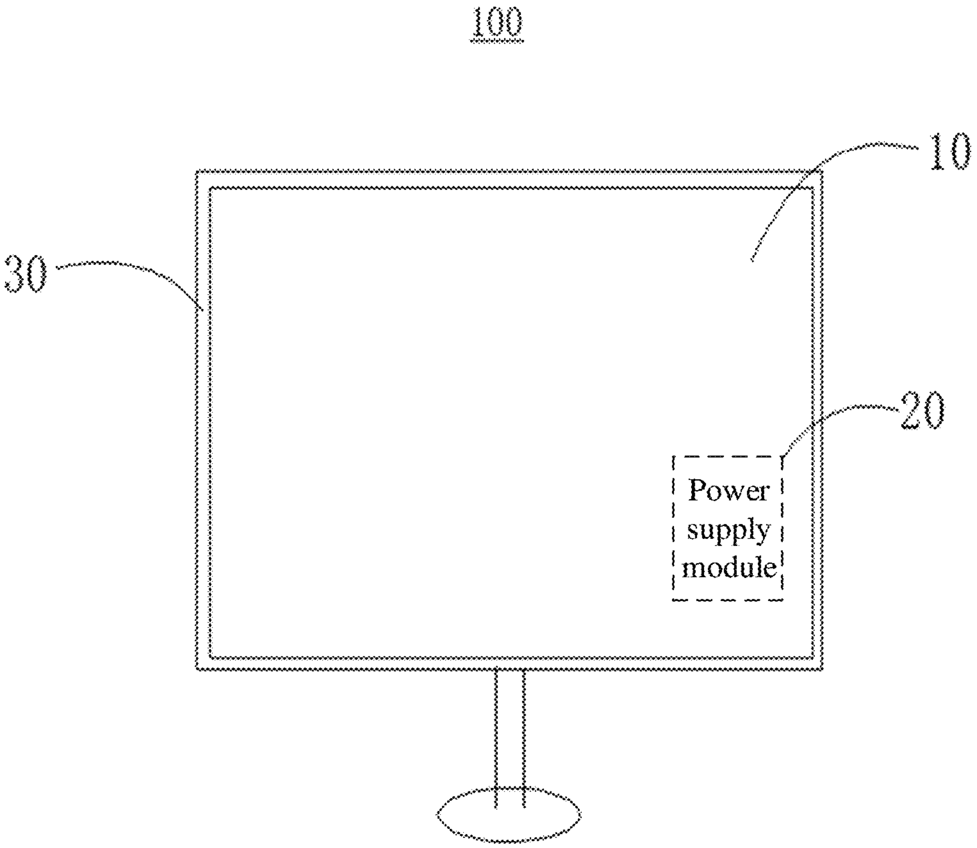
FIG. 1 is a schematic structural diagram of a display device in some implementations of the present disclosure.

REFERENCE SIGNS display device—100, mode control circuit—110, pull-up unit—110A, pull-down unit—110B, display module—10, power supply module—20, supporting frame—30, data driving circuit—11, 11*a*, 11*b*, scan driving circuit—12, LCD panel—13, display control circuit—14, pixel unit—15, backlight module—17, array substrate—131, liquid crystal layer—132, color film substrate—133, selecting unit—111, shift register—112, latch—113, amplifying unit—114, signal conversion unit—115, output buffer unit—116, selector—1112, first receiver—111A, second receiver—111B, inverter—1114, first resistor—R1, second resistor—R2, non-inverting input end of first receiver 111A—IN1, inverting input end of first receiver 111A—IN2, non-inverting input end of second receiver 111B—IN3, inverting input end of second receiver 111B—IN4, first direction—F1, second direction—F2, data lines—D1 to Dm, scan lines—S1 to Sn, pixel units—P11 to Pnm; data signal—Data, original data signal—Dv, clock signal—CLK, horizontal synchronization signal—Hsyn, vertical synchronization signal—Vsyn, gate output control signal—Cg, and source output control signal—Cs.

DETAILED DESCRIPTION

In order to facilitate understanding of the present disclosure, a comprehensive description will be given below with reference to relevant accompanying drawings. The accompanying drawings illustrate some exemplary implementations of the present disclosure. However, the present disclosure can be implemented in many different forms and is not limited to implementations described herein. On the contrary, these implementations are provided for a more thorough and comprehensive understanding of the present disclosure.

The following implementations are described with reference to accompanying drawings to illustrate particular implementations in which the present disclosure may be implemented. The serial numbers assigned herein for the components themselves, such as "first", "second", etc., are only used to distinguish between objects described and do not have any sequential or technical meaning. The "connection" and "coupling" in the present disclosure, unless otherwise specified, include direct and indirect connection (coupling). Direction terms mentioned in the present disclosure, such as "up", "down", "front", "back", "left", "right", "inside", "outside", "side", etc., are only directions with reference to the directions of the accompanying drawings. Therefore, the direction terms are used for better and clearer illustration and understanding of the present disclosure, and are not intended to indicate or imply that the device or component must have a specific orientation, be constructed and operated in the particular orientation, and therefore cannot be construed as limiting to the present disclosure.

In the description of the present disclosure, it should be noted that unless otherwise expressly specified or defined, terms such as "disposed", "arranged", "provided with", "mount", "couple", and "connect" should be understood broadly, and for example, a fixed connection, or a detachable connection, or an integrated connection; may be a mechanical connection; and may be a direct connection, or an indirect connection via an intermediate medium, or may be an internal communication between two components. The specific meanings of the above-mentioned terms in the present disclosure could be understood by those of ordinary skill in the art according to specific situations. It should be noted that the terms "first", "second", etc. in the specification, claims and accompanying drawings of the present disclosure are used to distinguish different objects, rather than to describe a specific order.

In addition, terms "comprise", "may comprise", "include", or "may include" used in the present disclosure indicate the existence of corresponding functions, operations, components, etc., which are disclosed, and do not limit one or more other functions, operations, components, etc. Moreover, the terms "comprise" or "include" indicate the existence of corresponding features, numbers, steps, operations, elements, components, or combinations thereof disclosed in the specification, and do not exclude the existence or addition of one or more other features, numbers, steps, operations, elements, components, or combinations thereof, with the intent of covering non-exclusive inclusion. Furthermore, when describing implementations of the present disclosure, "may" is used to mean "one or more implementations of the present disclosure". Also, the term "exemplary" is intended to refer to examples or illustrations.

Unless otherwise defined, all technical and scientific terms used herein have the same meaning as commonly understood by those skilled in the art of the present disclosure. The terms used herein in the specification of the present disclosure are for the purpose of describing specific implementations only and are not intended to limit the present disclosure.

Reference can be made to FIG. 1, which is a schematic structural diagram of a display device 100 in some implementations of the present disclosure. The display device 100 includes a display module 10, a power supply module 20, and a supporting frame 30. The display module 10 and the power supply module 20 are fixed to the supporting frame 30. The power supply module 20 is disposed on a back surface of the display module 10, that is, a non-display surface of the display module 10. The power supply module 20 is configured to provide a power supply voltage for the display module 10 for image display. The supporting frame 30 can fix and protect the display module 10 and the power supply module 20.

Figure 2:
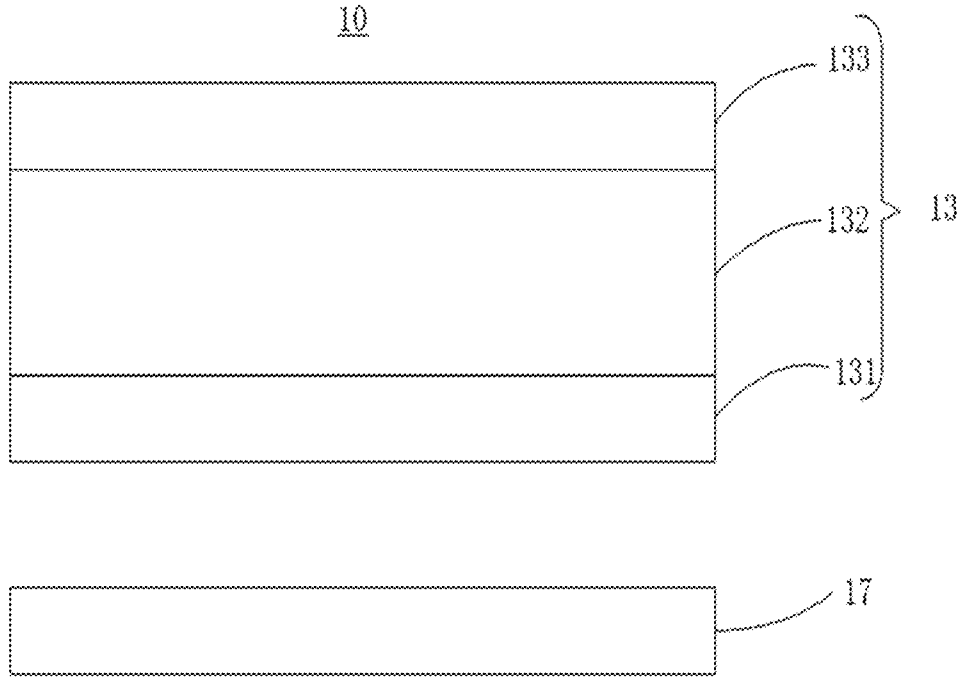
FIG. 2 is a schematic side structural diagram of a display module in FIG. 1.

Furthermore, reference can be made to FIG. 2, which is a schematic side structural diagram of the display module 10 in FIG. 1.

The display module 10 includes a Liquid-Crystal-Display (LCD) panel 13 and a backlight module (BM) 17. The BM 17 is configured to provide a light for display to the LCD panel 13. The LCD panel 13 is configured to emit a corresponding light according to an image signal Data to-be-displayed to perform image display. The display module 10 further includes other components or assemblies, such as a power supply module, a signal processor module, a signal sensing module, etc.

The LCD panel 13 includes an array substrate (AS) 131, a color film (CF) substrate 133, and a liquid crystal layer 132 sandwiched between the AS 131 and the CF substrate 133. Driving components disposed on the AS 131 and the CF substrate 133 are configured to generate a corresponding electric field according to the image signal Data, thereby driving liquid crystal molecules in the liquid crystal layer 132 to deflect angles to emit lights of corresponding brightness to perform image display.

Figure 3:
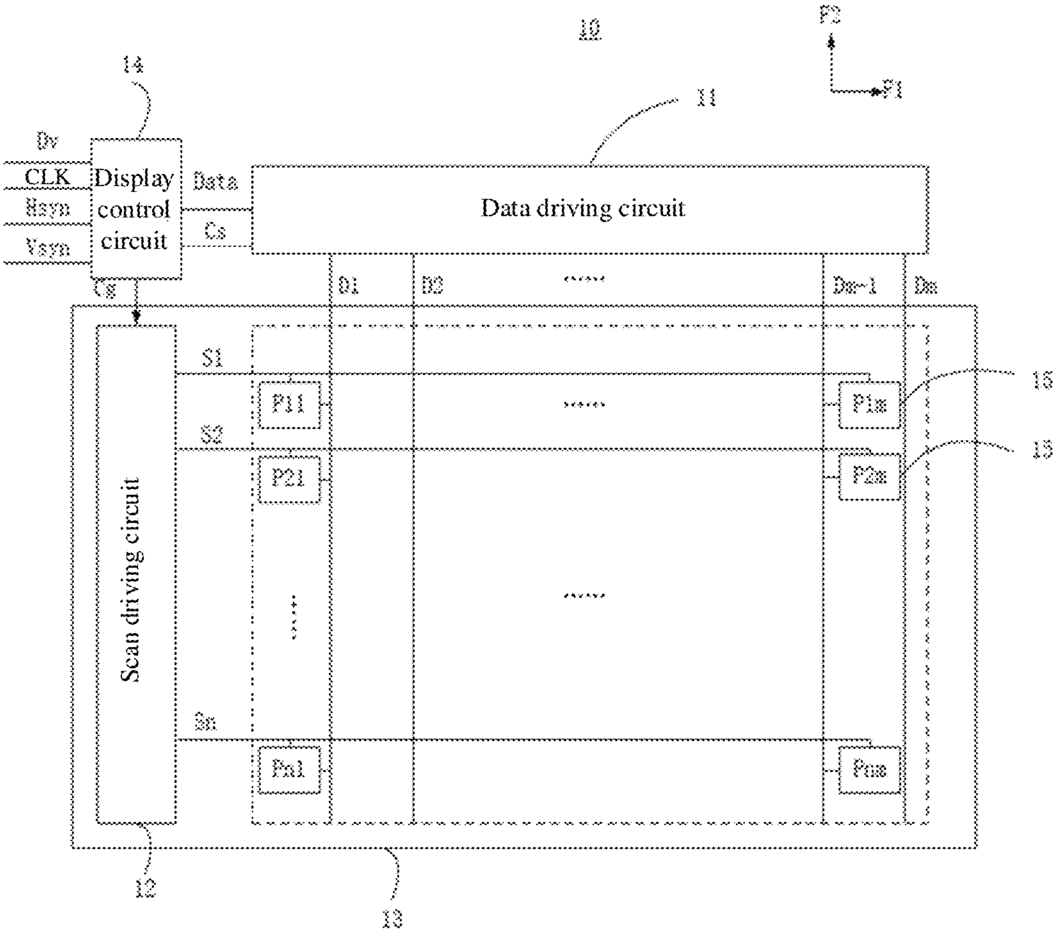
FIG. 3 is a schematic structural diagram of a plane layout of a display module in FIG. 1.

Reference can be made to FIG. 3, which is a schematic structural diagram of a plane layout of the display module 10 in FIG. 1.

As illustrated in FIG. 3, the display module 10 includes a data driving circuit 11, a scan driving circuit 12, a LCD panel 13, and a display control circuit 14.

Multiple scan lines S1 to Sn which extend in a first direction F1 and multiple data lines D1 to Dm which extend in a second direction F2 are arranged in a grid inside the LCD panel 13. The first direction F1 is perpendicular to the second direction F2, and the multiple scan lines S1 to Sn, the multiple data lines D1 to Dm, and the scan lines S1 to Sn and the data lines D1 to Dm are insulated from one another.

Pixel units 15 are disposed at intersections of the multiple scan lines S1 to Sn and the data lines D1 to Dm respectively. In implementations, the pixel units 15 can be represented as P11 to P1*m*, P21 to P2*m*, . . . , Pn1 to Pnm, respectively.

Each pixel unit 15 includes a driving component and the liquid crystal layer 132. The liquid crystal layer 132 is configured to emit a light under driving of the driving component. In implementations, the driving component includes a semiconductor switching component and an energy storage component. The semiconductor switching component may be a thin film transistor (TFT), and the energy storage component may be a capacitor formed by a pixel electrode (unmarked) and a common electrode (unmarked).

The scan lines S1 to Sn are coupled with the scan driving circuit 12 and are configured to receive scan signals from the scan driving circuit 12. The data lines D1 to Dm are coupled with the data driving circuit 11 and are configured to receive image signals or data signals Data maintained and transmitted in forms of grayscale values and convert the image signals or the data signals received into corresponding analog voltage values.

Under the control of the scan lines D1 to Dm, the pixel units 15 are configured to receive data voltages corresponding to the grayscale values in the image signals Data provided by the data lines D1 to Dm in a predetermined period of time, and drive the liquid crystal layer 132 to deflect corresponding angles according to the data voltages, such that backlights received are emitted in corresponding brightness according to the corresponding angles deflected, so as to emit lights of the corresponding brightness according to the image signals to perform image display.

A display control circuit 14 is configured to receive an original data signal Dv representing image information, a clock signal CLK for synchronization, a horizontal synchronization signal Hsyn, and a vertical synchronization signal Vsyn from an external signal source of the display module 10, and output a gate output control signal Cg for controlling the scan driving circuit 12, a source output control signal Cs for controlling the data driving circuit 11, and an adjusted image signal Data representing the image information. In implementations, the display control circuit 14 is configured to perform data adjustment on the original data signal to obtain the adjusted image signal Data, and transmit the adjusted image signal Data to the data driving circuit 11.

The scan driving circuit 12 is configured to receive the gate output control signal Cg output by the display control circuit 14 and output a scan signal to each of the scan lines S1 to Sn. The data driving circuit 11 is configured to receive the source output control signal Cs output by the display control circuit 14 and output an image signal Data to each of the data lines D1 to Dm, and the image signal Data is used for image display performed by the driving component in each pixel unit 15 of the LCD panel 13. The image signal Data provided to the LCD panel 13 is a grayscale voltage in an analog form. The scan driving circuit 12 can output scan signals and the data driving circuit 11 can output image signals, such that voltages corresponding to data signals for driving can be applied to driving components in the pixel units 15 to drive liquid crystal molecules to perform image display.

Figure 4:
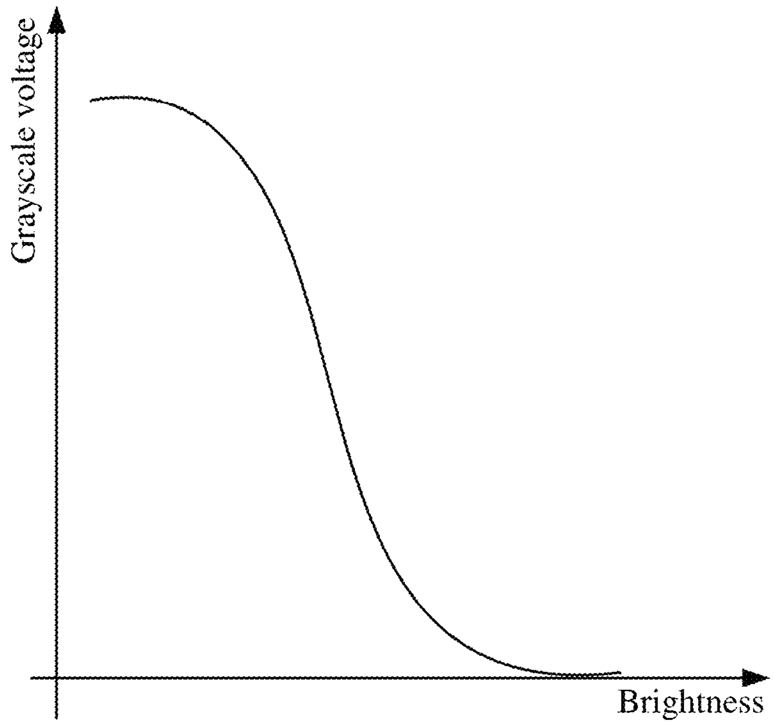
FIG. 4 is a characteristic curve of a normally-white Liquid-Crystal-Display (LCD) panel.
Figure 5:
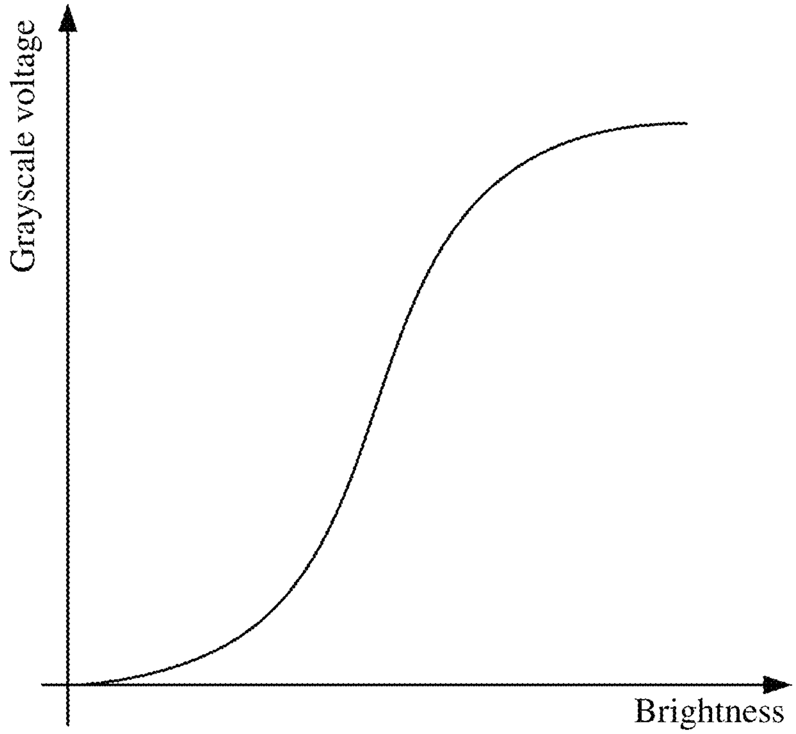
FIG. 5 is a characteristic curve of a normally-black LCD panel.

Reference can be made to FIG. 4 and FIG. 5 together, where FIG. 4 is a characteristic curve of a normally-white LCD panel, and FIG. 5 is a characteristic curve of a normally-black LCD panel. LCD panels can be divided in to a normally-white LCD panel and a normally-black LCD panel according to display characteristics. As illustrated in FIG. 4, in a normal white mode, brightness of a pixel unit 15 of the LCD panel 13 (FIG. 2) decreases as a grayscale voltage increases. As illustrated in FIG. 5, in a normal black mode, the brightness of the pixel unit 15 of the LCD panel 13 increases as the grayscale voltage increases. Therefore, when no voltage is applied, the normally-white LCD panel is displayed as white, that is, the LCD panel allows lights to pass through; and the normally-black LCD panel is displayed as black, that is, the LCD panel allows no light to pass through. A brightness curve of the normally-black LCD panel and a brightness curve of the normally-white LCD panel are completely symmetrical. For example, as for 8-bit data, if a numerical sequence corresponding to a highest grayscale, that is, the $256^{th}$ grayscale, is 11111111 in the normal white mode, then a numerical sequence corresponding to a highest grayscale, that is, the $256^{th}$ grayscale, is 00000000 in the normal black mode; and the numerical sequence corresponding to the $255^{th}$ grayscale is 11111110 in the normal white mode, and the numerical sequence corresponding to the $255^{th}$ grayscale is 00000001 in the normal black mode. By analogy, it can be seen that numerical sequences corresponding to the same grayscale in the normal white mode and in the normal black mode are just opposite.

Figure 6:
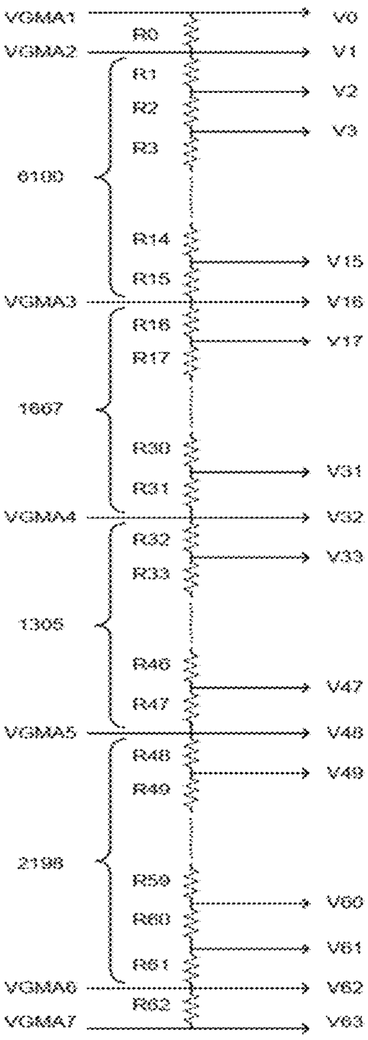
FIG. 6 is a gamma-correction correspondence table of a normally-white LCD panel.

Reference can be made to FIG. 6, which is a gamma-correction correspondence table of a normally-white LCD panel. As illustrated in FIG. 6, for the normally-white LCD panel, a first gamma voltage VGAM1 to a seventh gamma voltage VGAM7 correspond to a first grayscale V0 to a sixty-fourth grayscale V63 respectively. Voltage values of the first gamma voltage VGMA1 to the seventh gamma voltage VGAM7 gradually decrease, and brightness from the first grayscale V0 to the sixty-fourth grayscale V63 gradually increases, which correspond to the characteristic curve of the normally-white LCD panel (FIG. 4).

Figure 7:
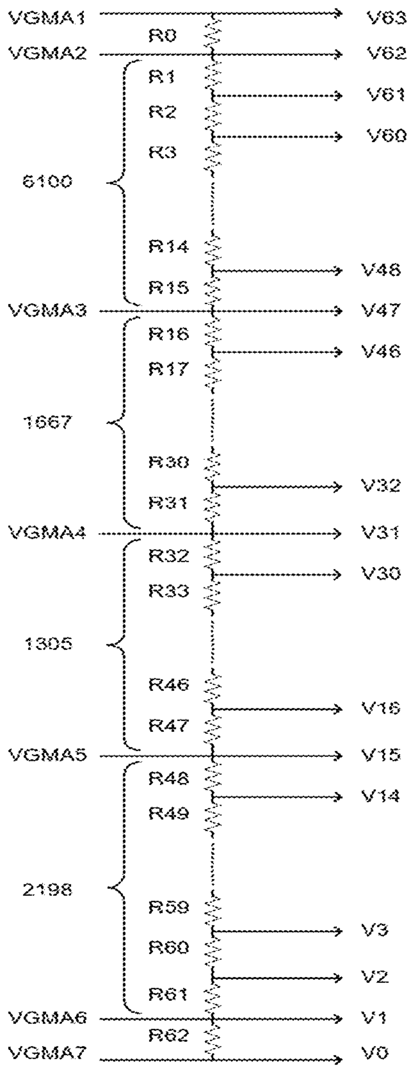
FIG. 7 is a gamma-correction correspondence table of a normally-black LCD panel.

Reference can be made to FIG. 7, which is a gamma-correction correspondence table of a normally-black LCD panel. As illustrated in FIG. 7, for the normally-black LCD panel, the first gamma voltage VGAM1 to the seventh gamma voltage VGAM7 correspond to the first grayscale V0 to the sixty-fourth grayscale V63 respectively. The voltage values of the first gamma voltage VGMA1 to the seventh gamma voltage VGAM7 gradually increase, and the brightness from the first grayscale V0 to the sixty-fourth grayscale V63 gradually increases, which correspond to the characteristic curve of liquid crystal display of the normally-black LCD panel (FIG. 5).

Figure 8:
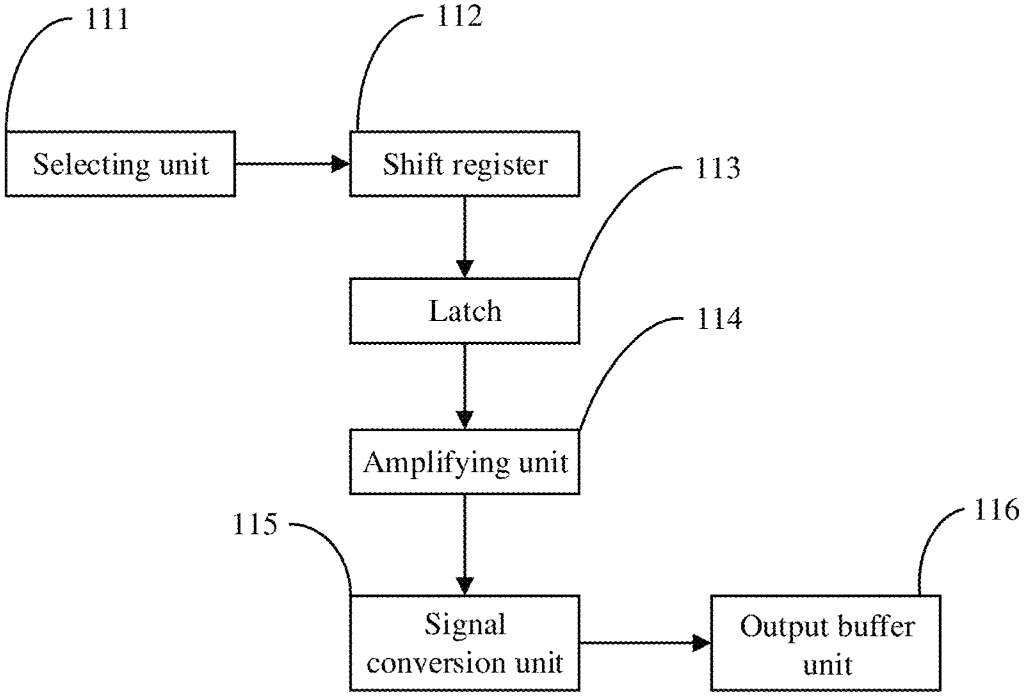
FIG. 8 is a circuit block diagram of a data driving circuit provided in some implementations of the present disclosure.

Reference can be made to FIG. 8, which is a circuit block diagram of a data driving circuit provided in other implementations of the present disclosure. As illustrated in FIG. 8, the data driving circuit 11 includes a selecting unit 111, a shift register 112, a latch 113, an amplifying unit 114, a signal conversion unit 115, and an output buffer unit 116.

The selecting unit 111 is coupled between the display control circuit 14 and the shift register 112. The selecting unit 111 is configured to receive the image signal output from the display control circuit 14, process the image signal received, and then transmit the image signal processed to the shift register 112.

The shift register 112 is configured to temporarily store the image signal received and transmit the image signal temporarily stored to the latch 113. The latch 113 is configured to latch the image signal received according to a threshold and transmit the image signal latched to the amplifying unit 114. The amplifying unit 114 is configured to amplify the image signal received and then transmit the image signal amplified to the signal conversion unit 115. The signal conversion unit 115 is configured to convert the image signal received into a grayscale voltage and transmit the grayscale voltage to the output buffer unit 116. The output buffer unit 116 is configured to amplify the grayscale voltage received.

Figure 9:
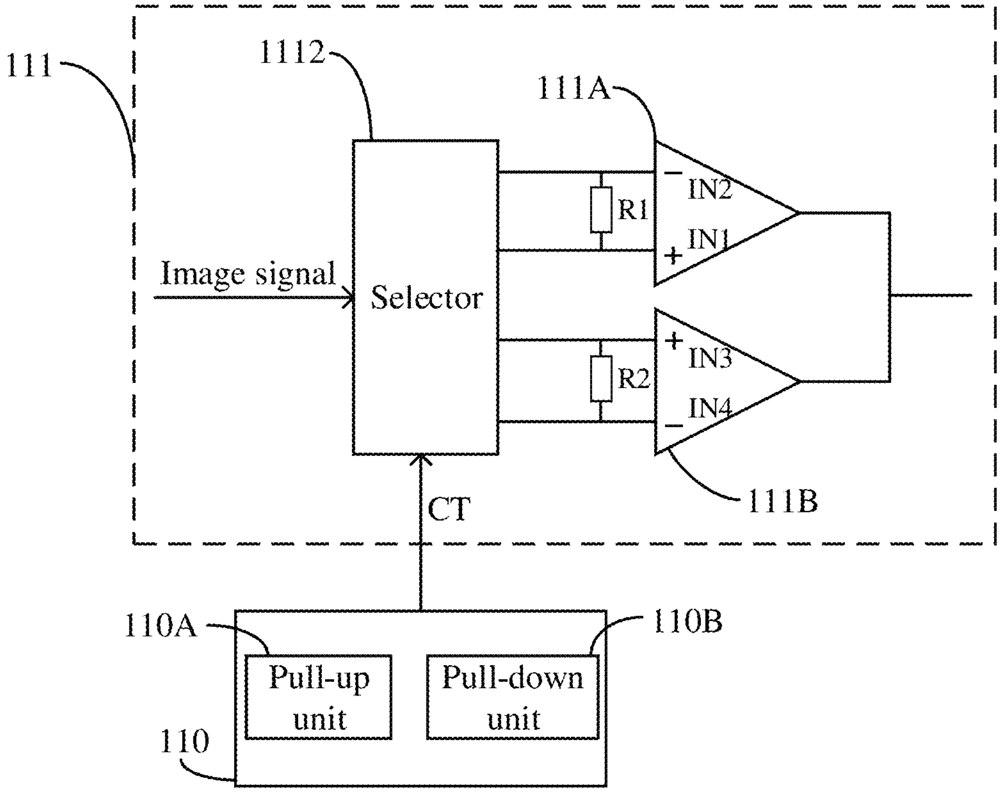
FIG. 9 is an equivalent circuit diagram of a selecting unit in FIG. 8.

Reference can be made to FIG. 9, which is the equivalent circuit diagram of the selecting unit 111 in FIG. 8. As illustrated in FIG. 9, the selecting unit 111 includes a selector 1112, a first receiver 111A, and a second receiver 111B.

The first receiver 111A and the second receiver 111B are connected with the selector 1112 in parallel. A first resistor R1 is disposed between a non-inverting input end IN1 and an inverting input end IN2 of the first receiver 111A, and a second resistor R2 is disposed between a non-inverting input end IN3 and an inverting input end IN4 of the second receiver 111B. An output end of the first receiver 111A and an output end of the second receiver 111B are connected.

The image signal transmitted by the display control circuit 14 is in a differential pair mode. The first receiver 111A can define a signal received as 0 or 1 according to a flow direction of a current on the first resistor R1 disposed between the non-inverting input end IN1 and the inverting input end IN2, and the second receiver 111B can define a signal received as 0 or 1 according to a flow direction of a current on the second resistor R2 disposed between the non-inverting input end IN3 and the inverting input end IN4.

In implementations, resistance values of the first resistor R1 and the second resistor R2 can be set to 100Ω. Other resistance values can also be set as required, which is not limited in the present disclosure.

Specifically, the selector 1112 is configured to receive the image signal transmitted by the display control circuit 14 and control the image signal to enter the first receiver 111A or the second receiver 111B according to a control signal CT. The control signal CT is determined by a first display mode of a LCD panel and a second display mode of a LCD panel. For a first-display-mode LCD panel, the control signal CT is preset to a high level. For a second-display-mode LCD panel, the control signal CT is preset to a low level. The selector 1112 is configured to control the image signal to enter the first receiver 111A or the second receiver 111B according to the high level or low level of the control signal CT. The first display mode is a default mode for the data driving circuit 11, and the image signal received by the data driving circuit 11 corresponds to the first display mode.

In an exemplary implementation, a mode control circuit 110 is disposed on a circuit board where the display control circuit 14 is located. The mode control circuit 110 includes a pull-up unit 110A and a pull-down unit 110B. For the first-display-mode LCD panel, the pull-up unit 110A outputs a control signal CT with a high level. For the second-display-mode LCD panel, the pull-down unit 110B outputs a control signal CT with a low level.

In an exemplary implementation, the mode control circuit 110 may also be directly disposed in the display control circuit 14 and the control signal CT may be output through one of signal terminals (pins) of the display control circuit 14.

In an exemplary implementation, the control signal CT may be a Current Transformer (CT) signal or other control signals that can control an output direction of the image signal, which is not limited in the present disclosure.

In an exemplary implementation, the first-display-mode LCD panel may be the normally-white LCD panel, the second-display-mode LCD panel may be the normally-black LCD panel, or the first-display-mode LCD panel may be the normally-black LCD panel and the second-display-mode LCD panel may be the normally-white LCD panel, which is not limited in the present disclosure.

When the first-display-mode LCD panel is the normally-white LCD panel, brightness of the pixel unit 15 of the normally-white LCD panel 13 is negatively related to the grayscale voltage, that is, when the grayscale voltage is higher, the brightness of the pixel unit 15 is lower. When the second-display-mode LCD panel is the normally-black LCD panel, the brightness of the pixel unit 15 of the normally-black LCD panel 13 is positively related to the grayscale voltage, that is, when the grayscale voltage is higher, the brightness of the pixel unit 15 is higher.

When the first-display-mode LCD panel is the normally-black LCD panel, the brightness of the pixel unit 15 of the normally-black LCD panel 13 is positively related to the grayscale voltage, that is, when the grayscale voltage is higher, the brightness of the pixel unit 15 is higher. When the second-display-mode LCD panel is the normally-white LCD panel, the brightness of the pixel unit 15 of the normally-white LCD panel 13 is negatively related to the grayscale voltage, that is, when the grayscale voltage is higher, the brightness of the pixel unit 15 is lower.

When the first display mode is the normal white mode, that is, the normal white mode is the default mode, the control signal CT is at high level, and the selector 1112 controls the image signal to enter the first receiver 111A. For the second-display-mode LCD panel, that is, the normally-black LCD panel, the control signal CT is at low level, and the selector 1112 controls the image signal to enter the second receiver 111B.

The non-inverting input end IN1 and the inverting input end IN2 of the first receiver 111A and the non-inverting input end IN3 and the inverting input end IN4 of the second receiver 111B are designed oppositely. In other words, the non-inverting input end IN1 of the first receiver 111A corresponds to the inverting input end IN4 of the second receiver 111B, and the inverting input end IN2 of the first receiver 111A corresponds to the non-inverting input end IN3 of second receiver 111B. By opposite designs, after the same image signals pass through the first receiver 111A and the second receiver 111B respectively, an image signal sequence outputted by the first receiver 111A and an image signal sequence outputted by the second receiver 111B are mutually inverted, or after mutually inverted image signal sequences pass through the first receiver 111A and the second receiver 111B respectively, the mutually inverted image signal sequences will become the same image signal sequences.

Figure 10:
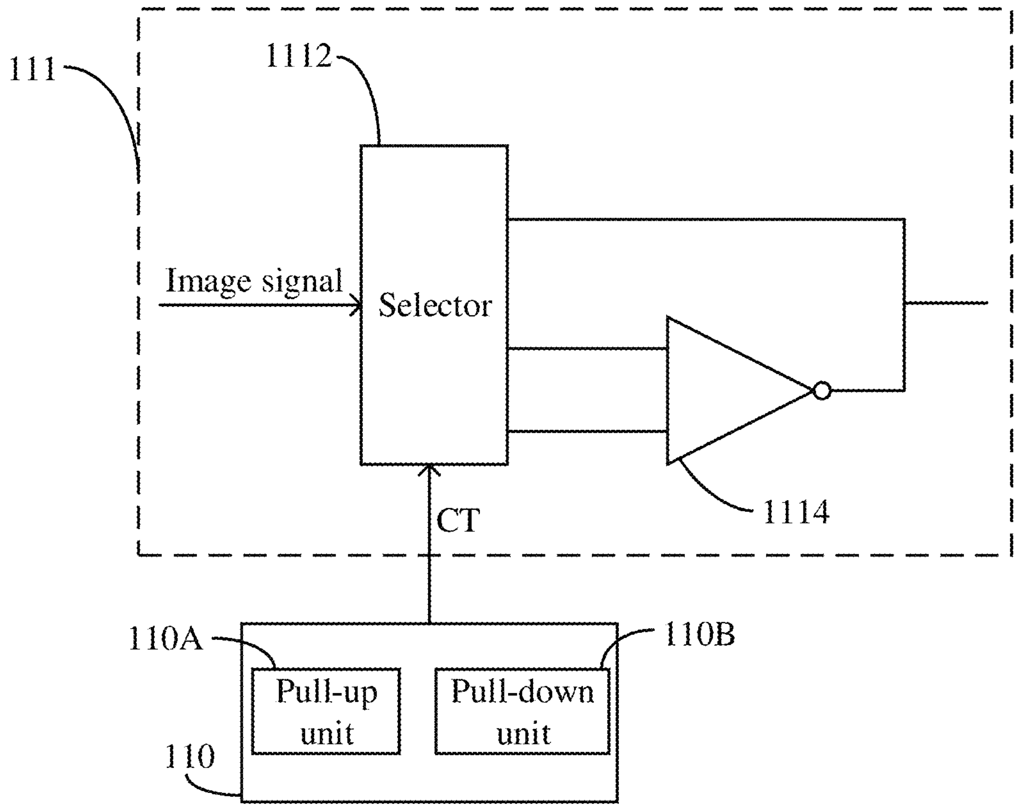
FIG. 10 is another equivalent circuit diagram of the selecting unit in FIG. 8.

In an exemplary implementation, the selecting unit 111 may also have another structure. Reference can be made to FIG. 10, which is an equivalent circuit diagram of another selecting unit of FIG. 8. As illustrated in FIG. 10, the selecting unit 111 includes a selector 1112 and an inverter 1114.

The selector 1112 is configured to receive the image signal transmitted by the display control circuit 14 and control the image signal to be transmitted directly to shift register 112 or to the inverter 1114 through the control signal CT. For the first-display-mode LCD panel, the control signal CT is at high level, and for the second-display-mode LCD panel, the control signal CT is at low level.

For example, when the first display mode is in the normal white mode, that is, the normal white mode is the default mode, the control signal CT corresponding to the normal white mode is at high level, and the selector 1112 controls the image signal to be directly transmitted to the shift register 112. The control signal CT corresponding to the normal black mode is at low level, the selector 1112 controls the image signal to enter the inverter 1114, and the inverter 1114 inverts a numerical sequence of the image signal received.

The selecting unit 111 is configured to transmit the image signal received to the signal conversion unit 115 through the shift register 112, the latch 113, and the amplifying unit 114. A gamma voltage corresponding to the first display mode and a gamma voltage corresponding to the second display mode are preset in the signal conversion unit 115, and are used for correcting the image signal received. If the selector 1112 in the selecting unit 111 controls the image signal corresponding to the first display mode to enter the first receiver 111A, the gamma voltage corresponding to the first display mode in the signal conversion unit 115 corrects the image signal. If the selector 1112 in the selecting unit 111 controls the image signal corresponding to the second display mode to enter the second receiver 111B, the gamma voltage corresponding to the second display mode in the signal conversion unit 115 corrects the image signal.

For example, when the first display mode is the normal white mode, driving of the data driving circuit 11 corresponding to the normal white mode is the default mode, the control signal CT corresponding to the first display mode is at high level, and the image signal enters the first receiver 111A under the control of the selector 1112. The second display mode is the normal black mode, and a corresponding control signal CT is at low level and enters the second receiver 111B under the control of the selector 1112.

In this case, when the data driving circuit 11 is disposed in the normally-white LCD panel, and the selector 1112 receives a first image signal from the display control circuit 14 and controls the first image signal to enter the first receiver 111A, where a numerical sequence corresponding to the first image signal is 10101010. Then, the first image signal enters the amplifying unit 114 through the shift register 112 and the latch 113. After being amplified, the first image signal enters the signal conversion unit 115. After being corrected by the gamma voltage corresponding to the normal white mode (FIG. 6) in the signal conversion unit 115, the first image signal is converted into a corresponding first grayscale voltage V1, and then the first grayscale voltage V1 is output to a corresponding pixel unit 15 through the output buffer unit 116 (FIG. 3).

When the data driving circuit 11 is disposed in the normally black LCD panel, the selector 1112 receives the first image signal from the display control circuit 14, where the numerical sequence corresponding to the first image signal is 10101010. Then, the selector 1112 controls the first image signal to enter the second receiver 111B, and the second receiver 111B inverts the first image signal and outputs a second image signal, where a numerical sequence corresponding to the second image signal is 01010101. In this case, the numerical sequence corresponding to the second image signal and the numerical sequence corresponding to the first image signal are mutually inverted. The second image signal enters the amplifying unit 114 through the shift register 112 and latch 113. After being amplified, the second image signal enters the signal conversion unit 115. After being corrected by the gamma voltage corresponding to the normal black mode (FIG. 7) in the signal conversion unit 115, the second image signal is converted into a corresponding second grayscale voltage V2, and then the second grayscale voltage V2 is output to a corresponding pixel unit 15 through the output buffer unit 116 (FIG. 3).

The same image signal can be displayed on the normally white LCD panel through the data driving circuit 11, or can also be displayed on the normally black LCD panel. In addition, the first grayscale voltage V1 and the second grayscale voltage V2 are mutually inverted. According to luminous characteristics of two kinds of panels, it can be seen that the first grayscale voltage V1 and the second grayscale voltage V2 control the pixel unit 15 of the normally-white LCD panel and the pixel unit 15 of the normally-black LCD panel respectively to display the same brightness. Therefore, the data driving circuit 11 can be disposed in each of the normally-white LCD panel and the normally-black LCD panel, which greatly improves compatibility of the data driving circuit 11.

Figure 11:
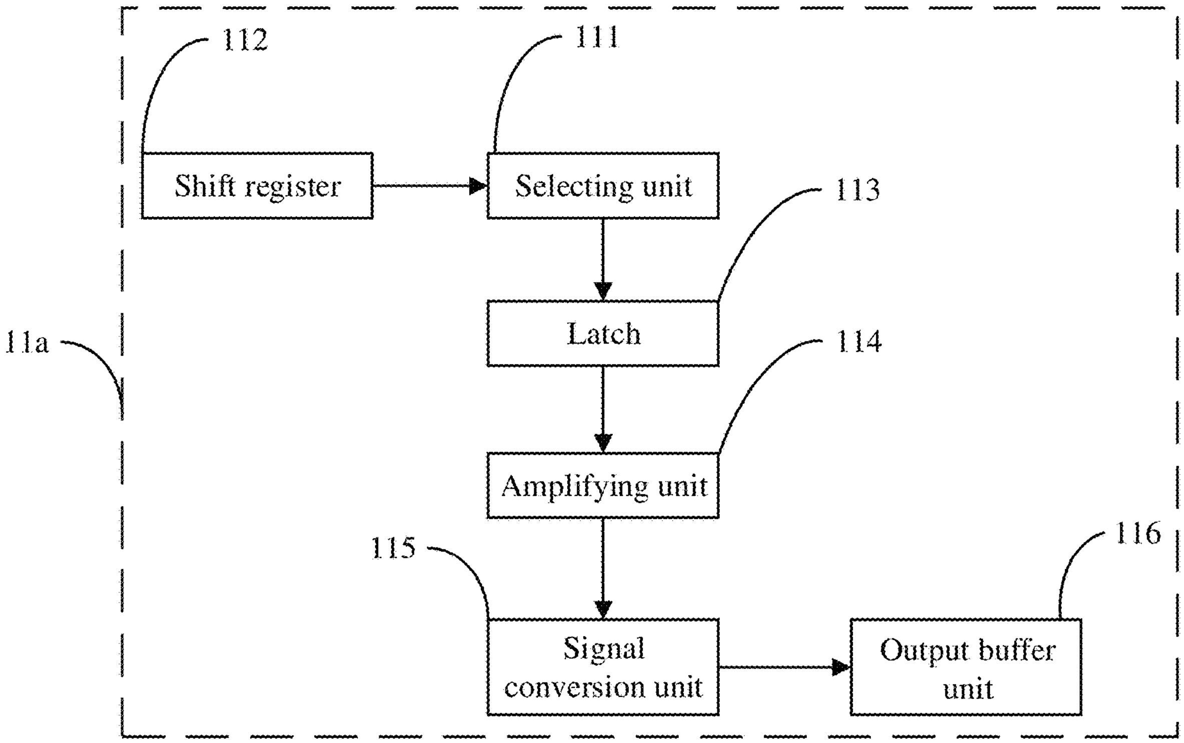
FIG. 11 is a circuit block diagram of a data driving circuit provided in other implementations of the present disclosure.

Reference can be made to FIG. 11, which is a circuit block diagram of a data driving circuit 11*a* provided in other implementations of the present disclosure. As illustrated in FIG. 11, the data driving circuit 11*a* includes a selecting unit 111, a shift register 112, a latch 113, an amplifying unit 114, a signal conversion unit 115, and an output buffer unit 116.

The shift register 112 is coupled with the display control circuit 14 and is configured to receive the image signal, shift the image signal received, and then temporarily store the image signal shifted. The selecting unit 111 is coupled between the shift register 112 and the latch 113. The selecting unit 111 is configured to receive the image signal temporarily stored in the shift register 112, and the selecting unit 111 is configured to transmit the image signal received to the latch 113 directly, or invert the image signal received and then transmit the image signal inverted to the latch 113. The latch 113 is configured to latch the image signal received according to a threshold. The amplifying unit 114 is configured to receive the image signal in the latch 113, amplify the image signal received, and then transmit the image signal amplified to the signal conversion unit 115. The signal conversion unit 115 is configured to convert the image signal received into the grayscale voltage and transmit the grayscale voltage to the output buffer unit 116, and the output buffer unit 116 is configured to receive the grayscale voltage from the signal conversion unit 115 and then amplify the grayscale voltage received.

The data driving circuit 11*a* is similar to the data driving circuit 11 in FIG. 8 except that the selecting unit 111 is disposed between the shift register 112 and the latch 113. The selecting unit 111 has the same internal structure as two circuit structures in FIG. 9 and FIG. 10. An effect obtained by disposing the selecting unit 111 between the shift register 112 and the latch 113 is the same as an effect of disposing the selecting unit 111 between the display control circuit and shift register 112 as illustrated in FIG. 8, that is, the data driving circuit 11*a* can be disposed in each of the normally-white LCD panel and the normally-black LCD panel.

Figure 12:
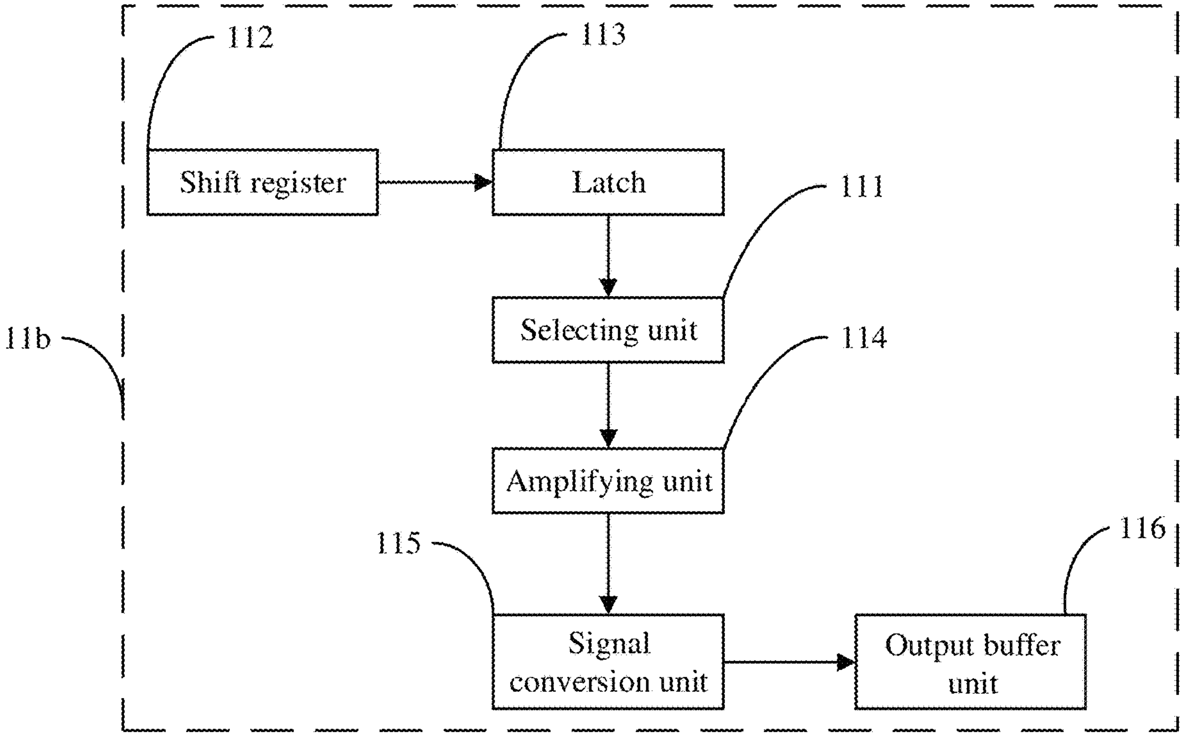
FIG. 12 is a circuit block diagram of a data driving circuit provided in other implementations of the present disclosure.

Reference can be made to FIG. 12, which is a circuit block diagram of a data driving circuit 11*b* provided in other implementations of the present disclosure. As illustrated in FIG. 12, the data driving circuit 11*b* includes a selecting unit 111, a shift register 112, a latch 113, an amplifying unit 114, a signal conversion unit 115, and an output buffer unit 116.

The shift register 112 is coupled with the display control circuit 14 and is configured to receive the image signal, shift the image signal received, and then temporarily store the image signal shifted. The latch 113 is coupled with the shift register 112 and is configured to latch the image signal received according to a threshold. The selecting unit 111 is coupled between the latch 113 and the amplifying unit 114. The selecting unit 111 is configured to receive the image signal latched in the latch 113, and the selecting unit 111 is configured to transmit the image signal received to the amplifying unit 114 directly, or invert the image signal received and then transmit the image signal inverted to amplifying unit 114. The amplifying unit 114 is configured to amplify the image signal received and then transmit the image signal amplified to the signal conversion unit 115. The signal conversion unit 115 is configured to convert the image signal received into the grayscale voltage and transmit the grayscale voltage to the output buffer unit 116, and the output buffer unit 116 is configured to receive the grayscale voltage from the signal conversion unit 115 and then amplify the grayscale voltage received.

The data driving circuit 11*b* is similar to the data driving circuit 11 in FIG. 8 except that the selecting unit 111 is disposed between the latch 113 and the amplifying unit 114. The selecting unit 111 has the same internal structural as the two circuit structures in FIG. 9 and FIG. 10. An effect obtained by disposing the selecting unit 111 between the latch 113 and the amplifying unit 114 is the same as the effect of disposing the selecting unit 111 between the display control circuit and shift register 112 as illustrated in FIG. 8, that is, the data driving circuit 11*b* can be disposed in each of the normally-white LCD panel and the normally-black LCD panel.

It should be understood that application of the present disclosure is not limited to the above examples. For those of ordinary skill in the art, improvements or changes can be made according to the above description, and these improvements and changes all fall within the protection scope of the appended claims of the present disclosure.

What is claimed is:

1. A data driving circuit, at least comprising:

a selecting unit comprising a selector, a first receiver, and a second receiver; and a signal conversion unit, wherein the selecting unit is configured to receive an image signal in a digital form, and is configured to, based on a control signal, transmit the image signal to either the first receiver or the second receiver, wherein the first receiver and the second receiver are connected with the selector in parallel, wherein a first resistor is disposed between a non-inverting input end of the first receiver and an inverting input end of the first receiver, wherein a second resistor is disposed between a non-inverting input end of the second receiver and an inverting input end of the second receiver, wherein an image signal sequence outputted by the first receiver and an image signal sequence outputted by the second receiver are mutually inverted, wherein the second receiver inverts the image signal and then transmits the image signal inverted to the signal conversion unit, and wherein the control signal represents a display mode of a pixel unit for image display, the signal conversion unit is configured to convert the image signal into a grayscale voltage in an analog form, and the grayscale voltage is used to drive the pixel unit to perform image display.

2. The data driving circuit of claim 1, wherein, the image signal is preset to correspond to a first display mode of the pixel unit; when the pixel unit is in the first display mode, the control signal is indicative of controlling the image signal to be transmitted to the signal conversion unit; and when the pixel unit is in a second display mode, the control signal is indicative of controlling the image signal to be inverted and then transmitted to the signal conversion unit.

3. The data driving circuit of claim 2, wherein, in the first display mode, brightness of the pixel unit is positively related to the grayscale voltage, and in the second display mode, the brightness of the pixel unit is negatively related to the grayscale voltage; or in the first display mode, the brightness of the pixel unit is negatively related to the grayscale voltage, and in the second display mode, the brightness of the pixel unit is positively related to the grayscale voltage.

4. The data driving circuit of claim 1, further comprising:

a shift register, a latch, an amplifying unit, and an output buffer unit, wherein, the selecting unit is coupled with the shift register, and the selecting unit is configured to transmit the image signal or the image signal inverted to the shift register for shift and temporary storage;

the latch is configured to receive the image signal or the image signal inverted temporarily stored in the shift register and latch the image signal or the image signal inverted according to a threshold; and the amplifying unit is configured to amplify the image signal or the image signal inverted and then transmit the image signal amplified or the image signal inverted which is amplified to the signal conversion unit, and the output buffer unit is configured to receive the grayscale voltage from the signal conversion unit and amplify the grayscale voltage received.

5. The data driving circuit of claim 1, further comprising:

a shift register, a latch, an amplifying unit, and an output buffer unit, wherein, the selecting unit is coupled between the shift register and the latch; the shift register is configured to shift the image signal received and temporarily store the image signal shifted, the selecting unit is configured to receive the image signal from the shift register, and the selecting unit is configured to transmit the image signal to the latch for latching according to a threshold, or invert the image signal and then transmit the image signal inverted to the latch for latching according to the threshold; and the amplifying unit is configured to amplify the image signal or the image signal inverted and then transmit the image signal amplified or the image signal inverted which is amplified to the signal conversion unit, and the output buffer unis is configured to receive the grayscale voltage from the signal conversion unit and amplify the grayscale voltage received.

6. The data driving circuit of claim 1, further comprising: a shift register, a latch, an amplifying unit, and an output buffer unit, wherein, the selecting unit is coupled between the latch and the amplifying unit; the shift register is configured to shift the image signal received and temporarily store the image signal shifted, the latch is configured to receive the image signal temporarily stored in the shift register and latch the image signal according to a threshold; the selecting unit is configured to receive the image signal from the latch, and the selecting unit is configured to transmit the image signal to the amplifying unit for amplifying, or invert the image signal and then transmit the image signal inverted to the amplifying unit for amplifying; and the amplifying unit is configured to amplify the image signal or the image signal inverted and then transmit the image signal amplified or the image signal inverted which is amplified to the signal conversion unit, and the output buffer unit configured to receive the grayscale voltage from the signal conversion unit and amplify the grayscale voltage received.

7. A display module, comprising:

a data driving circuit, comprising:

a selecting unit comprising a selector, a first receiver, and a second receiver; and a signal conversion unit, a scan driving circuit;

a Liquid-Crystal-Display (LCD) panel; and a display control circuit, wherein the selecting unit is configured to receive an image signal in a digital form, and is configured to, based on a control signal, transmit the image signal to either the first receiver or the second receiver, wherein the first receiver and the second receiver are connected with the selector in parallel, wherein a first resistor is disposed between a non-inverting input end of the first receiver and an inverting input end of the first receiver, wherein a second resistor is disposed between a non-inverting input end of the second receiver and an inverting input end of the second receiver, wherein an image signal sequence outputted by the first receiver and an image signal sequence outputted by the second receiver are mutually inverted, wherein the second receiver inverts the image signal and then transmits the image signal inverted to the signal conversion unit, wherein the control signal represents a display mode of a pixel unit for image display, the signal conversion unit is configured to convert the image signal into a grayscale voltage in an analog form, and the grayscale voltage is used to drive the pixel unit to perform image display, and wherein the display control circuit is configured to receive an original data signal from an external signal source, and output a source output control signal and a gate output control signal individually, and the LCD panel is controlled to perform image display by the data driving circuit according to the source output control signal and the scan driving circuit according to the gate output control signal.

8. The display module of claim 7, wherein, the image signal is preset to correspond to a first display mode of the pixel unit; when the pixel unit is in the first display mode, the control signal is indicative of controlling the image signal to be directly transmitted to the signal conversion unit; and when the pixel unit is in a second display mode, the control signal is indicative of controlling the image signal to be inverted and then transmitted to the signal conversion unit.

9. The display module of claim 8, wherein, in the first display mode, brightness of the pixel unit is positively related to the grayscale voltage, and in the second display mode, the brightness of the pixel unit is negatively related to the grayscale voltage; or in the first display mode, the brightness of the pixel unit is negatively related to the grayscale voltage, and in the second display mode, the brightness of the pixel unit is positively related to the grayscale voltage.

10. The display module of claim 7, wherein the data driving circuit further comprises:

a shift register, a latch, an amplifying unit, and an output buffer unit, wherein, the selecting unit is coupled with the shift register, and the selecting unit is configured to transmit the image signal or the image signal inverted to the shift register for shift and temporary storage; the latch is configured to receive the image signal or the image signal inverted temporarily stored in the shift register and latch the image signal or the image signal inverted according to a threshold; and the amplifying unit is configured to amplify the image signal or the image signal inverted and then transmit the image signal amplified or the image signal inverted which is amplified to the signal conversion unit, and the output buffer unit is configured to receive the grayscale voltage from the signal conversion unit and amplify the grayscale voltage received.

11. The display module of claim 7, wherein the data driving circuit further comprises:

a shift register, a latch, an amplifying unit, and an output buffer unit, wherein, the selecting unit is coupled between the shift register and the latch; the shift register is configured to shift the image signal received and temporarily store the image signal shifted, the selecting unit is configured to receive the image signal from the shift register, and the selecting unit is configured to transmit the image signal to the latch for latching according to a threshold, or invert the image signal and then transmit the image signal inverted to the latch for latching according to the threshold; and the amplifying unit is configured to amplify the image signal or the image signal inverted and then transmit the image signal amplified or the image signal inverted which is amplified to the signal conversion unit, and the output buffer unis is configured to receive the grayscale voltage from the signal conversion unit and amplify the grayscale voltage received.

12. The display module of claim 7, wherein the data driving circuit further comprises:

a shift register, a latch, an amplifying unit, and an output buffer unit, wherein, the selecting unit is coupled between the latch and the amplifying unit; the shift register is configured to shift the image signal received and temporarily store the image signal shifted, the latch is configured to receive the image signal temporarily stored in the shift register and latch the image signal according to a threshold; the selecting unit is configured to receive the image signal from the latch, and the selecting unit is configured to transmit the image signal to the amplifying unit for amplifying, or invert the image signal and then transmit the image signal inverted to the amplifying unit for amplifying; and the amplifying unit is configured to amplify the image signal or the image signal inverted and then transmit the image signal amplified or the image signal inverted which is amplified to the signal conversion unit, and the output buffer unit configured to receive the grayscale voltage from the signal conversion unit and amplify the grayscale voltage received.

13. A display device, comprising:

a display module, comprising:

a data driving circuit, comprising:

a selecting unit comprising a selector, a first receiver, and a second receiver; and a signal conversion unit, a scan driving circuit;
a Liquid-Crystal-Display (LCD) panel; and
a display control circuit,
wherein the selecting unit is configured to receive an image signal in a digital form, and is configured to, based on a control signal, transmit the image signal to either the first receiver or the second receiver,
wherein the first receiver and the second receiver are connected with the selector in parallel,
wherein a first resistor is disposed between a non-inverting input end of the first receiver and an inverting input end of the first receiver,
wherein a second resistor is disposed between a non-inverting input end of the second receiver and an inverting input end of the second receiver,
wherein an image signal sequence outputted by the first receiver and an image signal sequence outputted by the second receiver are mutually inverted,
wherein the second receiver inverts the image signal and then transmits the image signal inverted to the signal conversion unit,
wherein the control signal represents a display mode of a pixel unit for image display, the signal conversion unit is configured to convert the image signal into a grayscale voltage in an analog form, and the grayscale voltage is used to drive the pixel unit to perform image display;
and wherein the display control circuit is configured to receive an original data signal from an external signal source, and output a source output control signal and a gate output control signal individually, and the LCD panel is controlled to perform image display by the data driving circuit according to the source output control signal and the scan driving circuit according to the gate output control signal; a supporting frame; and a power supply module, wherein the power supply module is configured to provide a power supply voltage for the display module for image display, and the display module and the power supply module are fixed to the supporting frame.

14. The display device of claim 13, wherein, the image signal is preset to correspond to a first display mode of the pixel unit; when the pixel unit is in the first display mode, the control signal is indicative of controlling the image signal to be directly transmitted to the signal conversion unit; and when the pixel unit is in a second display mode, the control signal is indicative of controlling the image signal to be inverted and then transmitted to the signal conversion unit.

15. The display device of claim 13, wherein the data driving circuit further comprises:
a shift register, a latch, an amplifying unit, and an output buffer unit, wherein, the selecting unit is coupled with the shift register, and the selecting unit is configured to transmit the image signal or the image signal inverted to the shift register for shift and temporary storage; the latch is configured to receive the image signal or the image signal inverted temporarily stored in the shift register and latch the image signal or the image signal inverted according to a threshold; and the amplifying unit is configured to amplify the image signal or the image signal inverted and then transmit the image signal amplified or the image signal inverted which is amplified to the signal conversion unit, and the output buffer unit is configured to receive the grayscale voltage from the signal conversion unit and amplify the grayscale voltage received.

16. The display device of claim 13, wherein the data driving circuit further comprises:
a shift register, a latch, an amplifying unit, and an output buffer unit, wherein, the selecting unit is coupled between the shift register and the latch; the shift register is configured to shift the image signal received and temporarily store the image signal shifted, the selecting unit is configured to receive the image signal from the shift register, and the selecting unit is configured to transmit the image signal to the latch for latching according to a threshold, or invert the image signal and then transmit the image signal inverted to the latch for latching according to the threshold; and the amplifying unit is configured to amplify the image signal or the image signal inverted and then transmit the image signal amplified or the image signal inverted which is amplified to the signal conversion unit, and the output buffer unit is configured to receive the grayscale voltage from the signal conversion unit and amplify the grayscale voltage received.

* * * * *